No. 662,676. Patented Nov. 27, 1900.
E. MAYNZ.
FASTENING DEVICE FOR GLOVES, &c.
(Application filed Mar. 12, 1900.)
(No Model.)
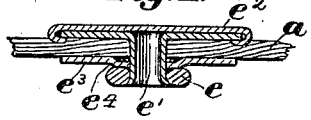
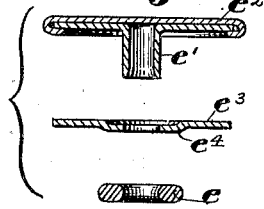
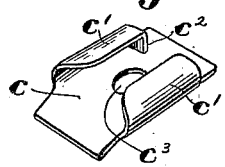
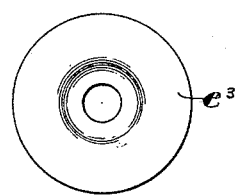
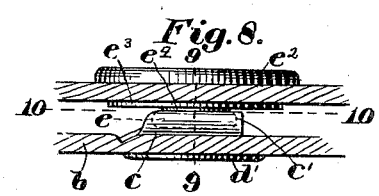
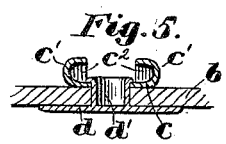
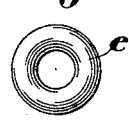
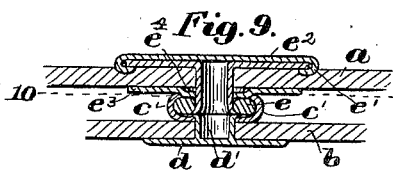
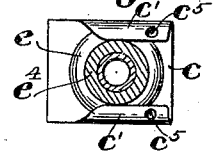
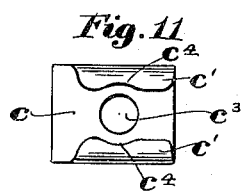
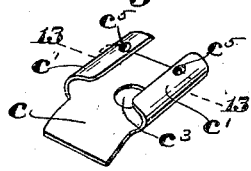
Witnesses:
Walter E. Lombard
A. D. Harrison
Inventor
Edward Maynz
by Wright Brown & Quimby
Attys.

UNITED STATES PATENT OFFICE.

EDWARD MAYNZ, OF BROOKLINE, MASSACHUSETTS, ASSIGNOR TO MELLEN BRAY, OF NEWTON, MASSACHUSETTS.

FASTENING DEVICE FOR GLOVES, &c.

SPECIFICATION forming part of Letters Patent No. 662,676, dated November 27, 1900.

Application filed March 12, 1900. Serial No. 8,264. (No model.)

*To all whom it may concern:*

Be it known that I, EDWARD MAYNZ, of Brookline, in the county of Norfolk and State of Massachusetts, have invented certain new and useful Improvements in Fastening Devices for Gloves, &c., of which the following is a specification.

This invention relates to a fastening device comprising a socket member attached to one of the parts to be connected by the device and a stud member attached to the other part, the two members having provisions for engaging each other to secure the two parts together.

The invention has for its object to provide an efficient and compact fastening device adapted to permit the fastening and separation of the parts by an edgewise movement of the outer and to positively connect the two parts, so that the outer cannot be lifted from the inner part or separated therefrom by a sidewise movement.

The invention consists in the improvements which I will now proceed to describe and claim.

Of the accompanying drawings, forming a part of this specification, Figure 1 represents a sectional view of the stud member of my improved fastening device. Fig. 2 represents in separate sectional views the parts of the stud member detached. Figs. 3 and 4 represent side views of the washer and ring of the stud member. Fig. 5 represents a sectional view of the socket member. Fig. 6 represents a perspective view of the socket member detached. Fig. 7 represents a sectional view of the attaching devices of the socket member. Fig. 8 represents a side view of the two members interlocked. Fig. 9 represents a section on line 9 9 of Fig. 8. Fig. 10 represents a section on line 10 10, Figs. 8 and 9. Fig. 11 represents a top view of the socket member. Fig. 12 represents a perspective view of another form of socket member. Fig. 13 represents a sectional view of the form shown in Fig. 12.

The same reference characters indicate the same parts in all the figures.

In the drawings, $a$ and $b$ represent the two parts of a glove or other article which are to be connected by my improved fastening device. Said device comprises a socket member attached to the part $b$ and a stud member attached to the part $a$. The socket member comprises a plate $c$, the edges of which are bent over to form ears $c'$ $c'$. The plate and its ears are made of sheet metal, and the ears are resilient and have inner edges which stand out from and project over the plate, as shown in Figs. 5 and 6. At or near one end of each ear is a stop, which prevents the stud member from being pulled through the space between the ears. As shown in Fig. 6, said stop is a wall $c^2$, connecting one end of the flange with the plate $c$. In Figs. 12 and 13 the stop is a boss or protuberance $c^5$, formed in the ear near one end thereof and projecting downwardly into the space between the ear and plate to form a stop and to create a frictional bearing on the stud member. A perforation $c^3$ is formed in the plate $c$ between the ears and receives an attaching-eyelet $d$, which passes through the part $b$ and has a head $d'$, which bears on one side of said part. The end of the eyelet $d$ is spread or upset in the perforation $c^3$ to secure the socket member to the part $b$. The stud member is composed of a ring $e$, constituting the head of the stud, and auxiliary parts comprising an attaching-eyelet $e'$, formed to enter the ring and be spread or upset therein, a head $e^2$, formed on the eyelet and adapted to bear on the outer side of the piece $a$, and a washer $e^3$, surrounding the eyelet $e'$ and bearing against the inner side of the piece $a$ and against the inner side of the ring $e$. The central portion of the washer is preferably offset, as shown at $e^4$, so that a rigid-walled annular groove or crevice is formed between the adjacent surfaces of the washer and ring, as shown in Fig. 1. Said groove receives the inwardly-projecting edges of the ears $c'$ $c'$ of the socket member when the members are connected and is V-shaped or tapering in cross-section, as shown in Fig. 1, so that the resilient ears bear on converging surfaces, and are thus caused to firmly grasp the stud member. The diameter and form of the ring $e$ are such that the ring can be inserted in the space between the outer ends of the ears $c'$, the ears projecting into the groove between the ring $e$ and washer $e^3$, as shown in Figs. 9 and 10. The resilience of the edges of the ears $c'$ causes the ring $e$ and washer $e^3$ to come to a bearing on the ears, as indicated in Fig. 10, the resilience of the ears causing them to grasp the neck formed by the ring and the offset portion $e^4$ of the washer and hold said neck with sufficient firmness to prevent accidental separation of the two members. The ears may be provided with recesses $c^4$, as shown in Fig. 11, said recesses enabling the ears to more positively engage the neck between them.

The ring $e$, eyelet $e'$, head $e^2$, and washer $e^3$ constitute a stud member adapted to be conveniently and securely applied to the part $a$, the eyelet holding the ring firmly around its inner periphery, so that the ring is not liable to be wrenched off.

I claim—

1. A fastening device for connecting an outer and an inner part, the same comprising a socket member bearing on and attached to the inner part and having ears forming the sides of a stud-receiving space, and a stud member comprising a ring located at the inner side of the outer part, and an attaching-eyelet passed through the outer part and engaged with the interior of the ring, the said ears and ring being formed to interlock.

2. A fastening device for connecting an outer and an inner part, the same comprising a socket member bearing on and attached to the inner part and having ears forming the sides of a stud-receiving space, and a stud member comprising a ring located at the inner side of the outer part, an attaching-eyelet passed through the outer part and engaged with the interior of the ring, and a washer interposed between the ring and the inner side of the outer part and coöperating with the ring in forming an annular groove with rigid walls to receive the ears of the socket member.

3. A fastening device for connecting an outer and an inner part, the same comprising a socket member bearing on and attached to the inner part and having ears forming the sides of a stud-receiving space, and a stud member comprising a ring located at the inner side of the outer part, an attaching-eyelet passed through the outer part and engaged with the interior of the ring, and a washer interposed between the ring and the inner side of the outer part, and coöperating with the ring in forming an annular groove with rigid walls to receive the ears of the socket member, said ears being resilient and adapted to grasp the walls of said groove.

4. A stud member of a fastening device for connecting an outer and an inner part, the same comprising a ring, an attaching-eyelet passing through the said outer part and engaged at its inner end with the interior of the ring, and a washer interposed between the ring and the inner side of the outer part and coöperating with the ring in forming a rigid-walled annular groove.

5. A stud member of a fastening device for connecting an outer and an inner part, the same comprising a ring, an attaching-eyelet passing through the said outer part and engaged at its inner end with the interior of the ring, and a washer interposed between the ring and the inner side of the outer part and coöperating with the ring in forming a rigid-walled annular groove, said washer having an offset central portion forming one wall of the groove.

6. A socket member of a fastening device, comprising a plate having resilient ears separated by a stud-receiving space, said ears having downwardly-projecting stops for a stud member.

In testimony whereof I have affixed my signature in presence of two witnesses.

EDWARD MAYNZ.

Witnesses:
C. F. BROWN,
A. D. HARRISON.